United States Patent [19]

Chang

[11] Patent Number: 5,060,898
[45] Date of Patent: Oct. 29, 1991

[54] STRUCTURE OF SURFACE MOUNTING SUPPORT

[76] Inventor: Wen-Shyong Chang, No. 106, Chung Hsin Rd., Sec. 2, Wu Ku Hsiang, Taipei Hsien, Taiwan

[21] Appl. No.: 618,847
[22] Filed: Nov. 28, 1990
[51] Int. Cl.⁵ ............................................. A47B 96/06
[52] U.S. Cl. ................................ 248/224.1; 248/224.2; 403/381
[58] Field of Search ............... 248/205.3, 205.4, 224.1, 248/224.2; 403/381

[56] References Cited

U.S. PATENT DOCUMENTS 1,951,656  3/1934  Haffling ........................... 248/222.4
3,809,799  5/1974  Taylor ........................... 248/205.3 X

FOREIGN PATENT DOCUMENTS 1164256  2/1964  Fed. Rep. of Germany ... 248/224.1

Primary Examiner—Andrew V. Kundrat
Attorney, Agent, or Firm—Varndell Legal Group

[57] ABSTRACT

A surface mounting support, comprising a body, which optionally can be back-glued for fastening to a flat wall surface through an adhesive joint, having a dovetailed upper part for supporting an object through a dovetail joint and a unitary hook at the bottom for holding something. The object which is mounted on the surface mounting support has a dovetail groove on the back, which dovetail groove has two opposite, beveled side walls respectively projecting inwards. The dovetailed upper part of the surface mounting support is made in a shape and size to tightly fit the dovetail groove. A fissure is made on the top of the body for fastening a thread by which the body can be suspended in a vertical position for correct angle position checking during installation.

2 Claims, 4 Drawing Sheets

STRUCTURE OF SURFACE MOUNTING SUPPORT

BACKGROUND AND SUMMARY OF THE INVENTION

The present invention relates to surface mounting supports, and more particularly to a surface mounting support fastened to a flat wall surface for mounting an object through a dovetail joint, which has a unitary hook at the bottom for holding something.

When fastening a surface mounting support to a wall surface for supporting something, it is very difficult to correctly check the angle position of a surface mounting support by vision. If a surface mounting support is not fastened to a wall surface at a correct angle position, it may have to be removed from a wall surface and then mounted again.

Further, in a bathroom or lavatory, a soap case is generally fastened in the wall for holding soap. Conventionally, suction disc 12 is commonly used for mounting a soap case 1 to a wall surface (see FIG. 1). Although a suction disc is easy to install in a wall surface, it may drop from a wall surface easily due to permeation of air and moisture.

The present invention has been accomplished in view of the above circumstances. According to a first aspect of the present invention, a surface mounting support has a dovetailed upper part for mounting an object through a dovetail joint. According to a second aspect of the present invention, a surface mounting support has a unitary hook for holding something. According to a third aspect of the present invention, a surface mounting support has an opening on the back and a fissure at the top, through the opening a thread can be fastened in the fissure, so that the body can be suspended from the thread in a vertical position for correct angle position checking during installation.

DETAILED DESCRIPTION OF THE PREFERRED EMBODIMENT

Figure 1:
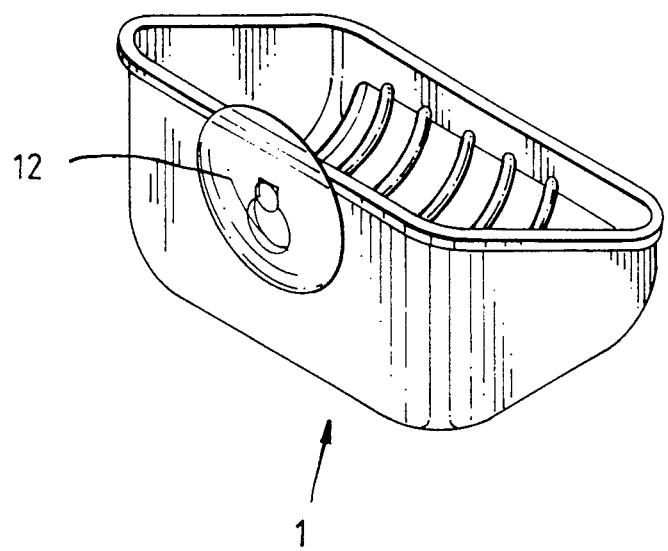
FIG. 1 illustrates a suction disc connected to a soap case for mounting a soap case on a flat wall surface.
Figure 2:
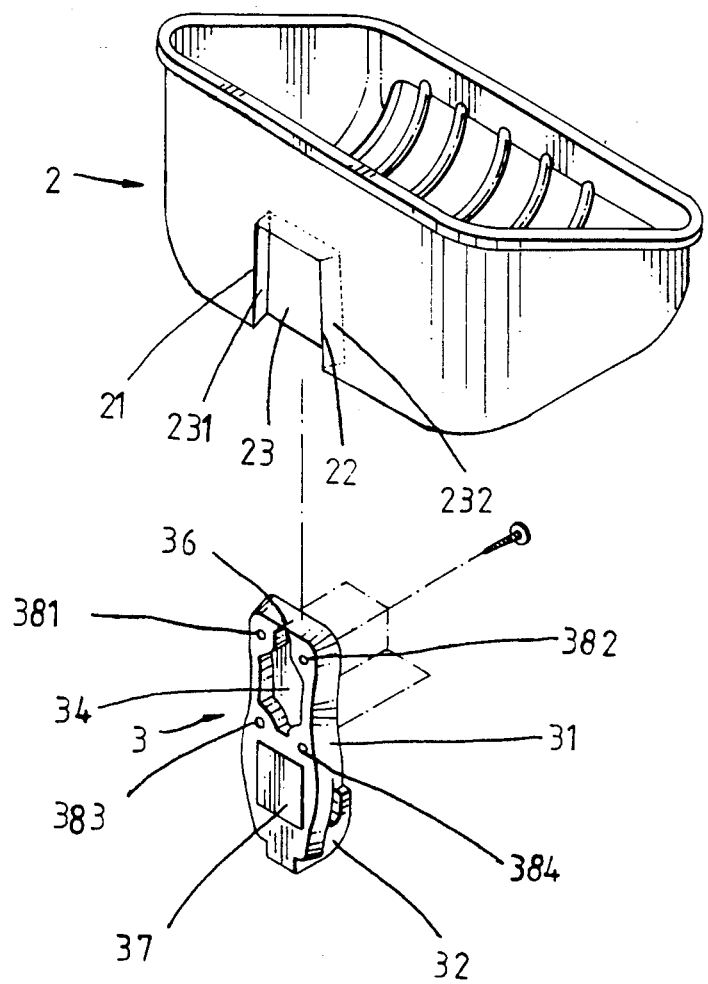
FIG. 2 is a perspective dismantled view of the preferred embodiment of the present invention.
Figure 3:
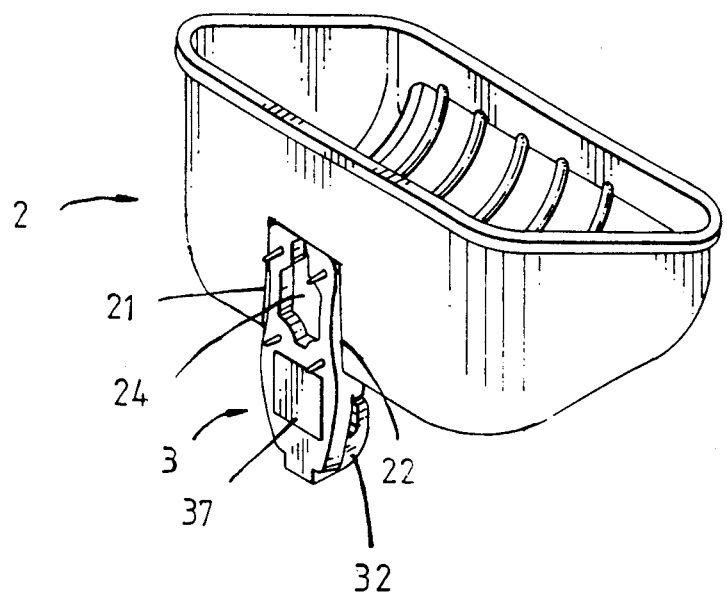
FIG. 3 is a perspective assembly view of the preferred embodiment of the present invention.
Figure 4:
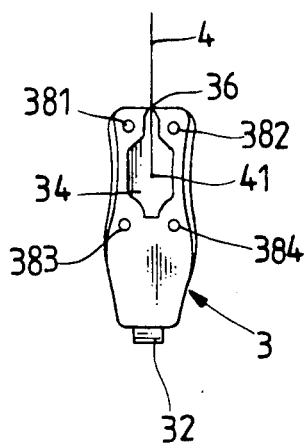
FIG. 4 illustrates an operation to fasten a thread in the fissure of the surface mounting support.
Figure 5:
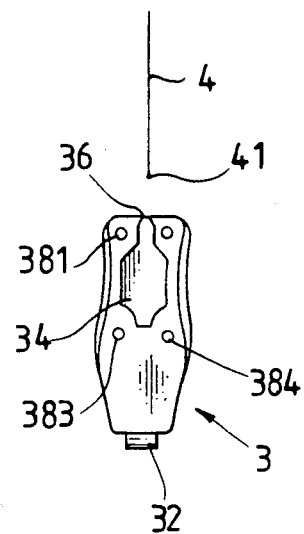
FIG. 5 illustrates an operation to remove a thread from the fissure of the surface mounting support.

Referring to FIGS. 2 through 4, there is illustrated a surface mounting support embodying the present invention. In this embodiment, a surface mounting support is provided for mounting a soap case 2 on a wall surface. As illustrated, a surface mounting support 3 comprises a body 31 having a unitary hook 32 at the bottom. A double-sided adhesive tape 37 is attached to the back side of the body 31 so that the body 31 can be conveniently secured to a flat wall surface through adhesive joint. A plurality of through holes 381, 382, 383 and 384 are made on the body 31 at suitable locations for fastening screws or nails. There is also a fissure 36 made at the middle of the top edge of the body 31, and an opening 34 made on the back side of the body 31. A thread 4 which has a knot 41 made at one end can be inserted from the opening 24 through the fissure 36 permitting the knot 41 to be stopped at the fissure 36. Therefore, by holding the opposite end of the thread 4, the surface mounting support 3 can be suspended from the knot 41 in a vertical position for correct installation without making any verification on angle position. After the surface mounting support 3 is fastened in a wall surface, the thread 4 can be conveniently removed from the surface mounting support 3 just by pulling it upward by force.

Referring to FIG. 2 again, a soap case 2 can be conveniently mounted on the surface mounting support 3 by means of dovetail joint. The soap case has a dovetail groove 23 on the back and defined between two opposite, bevel side walls 21 and 22. The two opposite, beveled side walls 21 and 22 have each a surface 231 or 231 respectively projecting inwards. Further, the upper part of the body 31 of the surface mounting support 3 is made shape and size to tightly fit the dovetail groove 23. By inserting the dovetailed upper part of the body 31 in the dovetail groove 23 of the soap case 2, the soap case can be firmly supported by the body 31 and the hook 32 of the surface mounting support 3.

As an alternate form of the present invention, the dovetail groove 23 on the back of the soap case 2 can be made in such a way that two raised strips are obliquely made on the back of the soap case 2 defining therebetween a dovetail groove 23 for fastening the dovetailed upper part of the body 31 of the surface mounting support 3.

Figure 6:
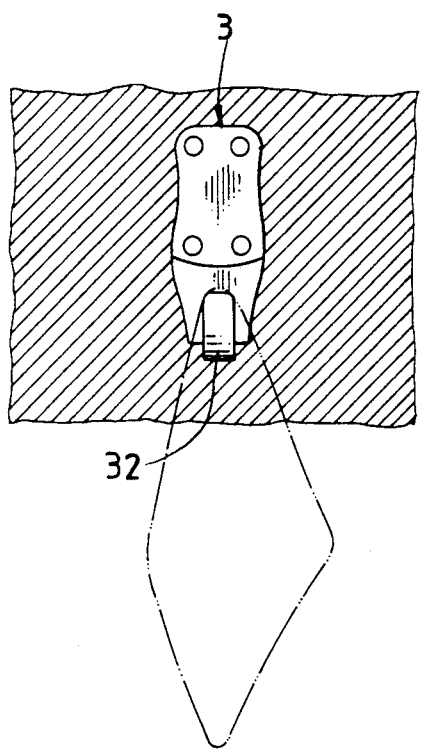
FIG. 6 and 7 illustrate applications of the present invention.
Figure 7:
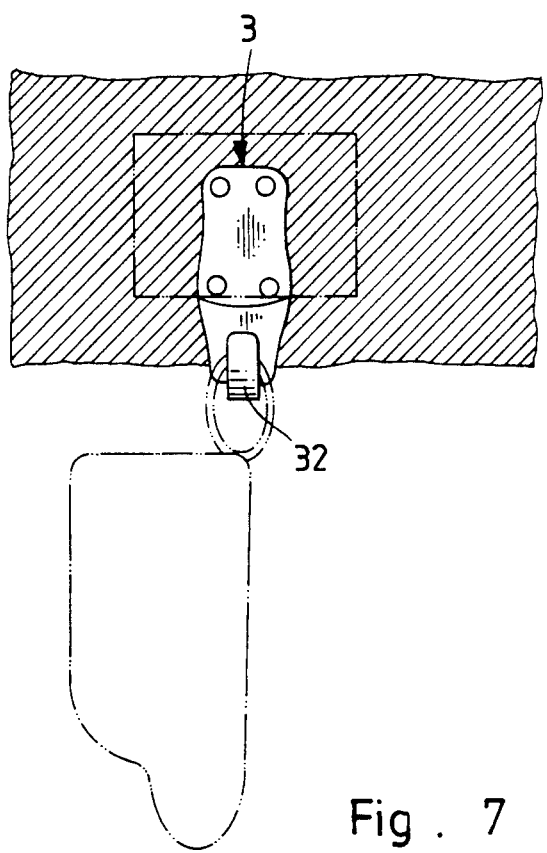

Referring to FIG. 6, the surface mounting support 3 is fastened in a wall surface with the hook 32 disposed for mounting an object. Referring to FIG. 7, an object is mounted on the upper part of the body 31 of the surface mounting support 3 through dovetail joint, and another object is mounted on the hook 32 of the surface mounting support 3.

I claim:

1. A surface mounting support comprising a body having a dovetailed upper part for supporting an object through a dovetail join; said body having a plurality of holes for fastening to a wall surface by fastening elements, a unitary hook at a bottom thereof for holding something and supporting said object, and an opening for fastening a thread in a fissure located at a top edge of said body for permitting said body to be suspended from said thread in a vertical position for angle position checking during mounting of said body on said wall surface; said object having a back containing a dovetail groove, said dovetail groove having two opposite, beveled side walls respectively projecting inwards; and said dovetailed upper part of said surface mounting support having a shape and size tightly fitting with said dovetail groove.

2. The surface mounting support of claim 1, wherein said body has a flat back surface with a double-sided adhesive tape attached thereto for fastening to a flat wall surface through an adhesive joint.

* * * * *